(12) United States Patent
Purbrick et al.

(10) Patent No.: US 6,762,006 B2
(45) Date of Patent: Jul. 13, 2004

(54) SOLID PARTICLE DISPERSIONS AND THEIR USE IN THE PREPARATION OF LASER THERMAL MEDIA

(75) Inventors: Malcolm D. Purbrick, Bushey (GB); Marie C. Bunce, Harrow (GB); Phillip J. Coldrick, Twickenham (GB); Danuta Gibson, Garston Watford (GB); Ian M. Newington, Hazlemere (GB); Dawn J. Jenkins, Chesham (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/254,262

(22) Filed: Sep. 25, 2002

(65) Prior Publication Data
US 2003/0138723 A1 Jul. 24, 2003

(30) Foreign Application Priority Data
Nov. 21, 2001 (GB) .............................................. 0127896

(51) Int. Cl.$^7$ .............................. G03F 7/105; G03F 7/34
(52) U.S. Cl. .................... 430/201; 430/200; 430/270.1; 430/964
(58) Field of Search ................................ 430/200, 201, 430/270.1, 964

(56) References Cited

U.S. PATENT DOCUMENTS

| | | | | |
|---|---|---|---|---|
| 3,964,389 A | * | 6/1976 | Peterson ..................... | 430/201 |
| 4,621,271 A | | 11/1986 | Brownstein | |
| 5,156,938 A | * | 10/1992 | Foley et al. ................ | 430/200 |
| 5,278,023 A | | 1/1994 | Bills et al. | |
| 5,468,591 A | | 11/1995 | Pearce et al. ............... | 430/201 |
| 5,607,810 A | | 3/1997 | Verburgh et al. | |
| 5,657,931 A | | 8/1997 | Nair et al. | |
| 5,712,079 A | | 1/1998 | Robello et al. ............. | 430/200 |
| 5,998,088 A | * | 12/1999 | Robello et al. ............. | 430/201 |
| 6,068,967 A | | 5/2000 | Suzuki et al. | |
| 6,096,472 A | | 8/2000 | Niemeyer | |
| 6,124,075 A | * | 9/2000 | Ishihara et al. ............ | 430/201 |
| 6,551,757 B1 | * | 4/2003 | Bailey et al. ............... | 430/964 |
| 2003/0235768 A1 | * | 12/2003 | Fincher et al. .................. | 430/7 |

FOREIGN PATENT DOCUMENTS

| | | |
|---|---|---|
| EP | 1 079 274 A2 | 2/2001 |
| GB | 2 083 726 A | 3/1982 |
| WO | 90/12342 | 10/1990 |

* cited by examiner

Primary Examiner—Richard L. Schilling
(74) Attorney, Agent, or Firm—Kathleen Neuner Manne

(57) ABSTRACT

A donor element for use in laser thermal imaging has a layer which comprises an infrared-absorbing material, an image dye and a polymer matrix comprising a thermally degradable polymer and a non thermally degradable polymer there being an interaction between the infrared-absorbing material and the non degradable polymer to facilitate retention of the infrared-absorbing material in the donor element. The degradable and non degradable polymers are preferably copolymers both of which contain methacrylic acid as a monomer. The degradable polymer is preferably a copolymer of methoxyethyl cyanoacrylate and methacrylic acid preferably in molar proportions of from 1:1 to 12:1. The non degradable polymer is preferably a copolymer of methyl methacrylate and methacrylic acid, preferably in molar proportions of from 1:1 to 15:1.

The element may be prepared from an aqueous solid particle dispersion which has been prepared by milling the components together in a ball mill.

11 Claims, 1 Drawing Sheet

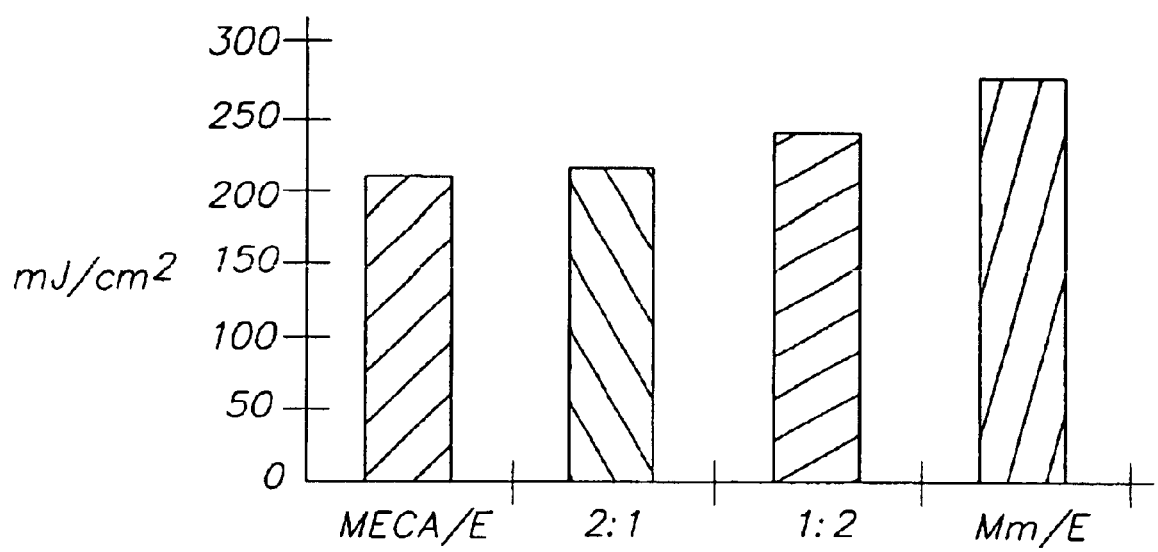

SOLID PARTICLE DISPERSIONS AND THEIR USE IN THE PREPARATION OF LASER THERMAL MEDIA

FIELD OF THE INVENTION

This invention relates to solid particle dispersions and their use in the preparation of aqueous coatable laser thermal media.

BACKGROUND OF THE INVENTION

In recent years thermal transfer systems have been developed to obtain prints from pictures which have been generated electronically from color video cameras. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face to face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No 4,621,271.

Another way to thermally obtain a print using the electronic signals described above is to use a laser instead of a thermal printing head. In such a system the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature to transfer to the receiver. The absorbing material may be present in a layer beneath the dye and/or it may be admixed with the dye. The laser beam is modulated by electronic signals which are representative of the shape and color of the original image, so that each dye is heated to cause volatilisation only in those areas in which its presence is required on the receiver to reconstruct the color of the original object. Further details of this process are found in GB 2083726A.

In one ablative mode of imaging by the action of a laser beam, an element with a dye layer composition comprising an image dye, an infrared-absorbing material and a binder coated onto a substrate is imaged from the dye side. The energy provided by the laser drives off substantially all of the image dye and binder at the spot where the laser beam hits the element. In ablative imaging, the laser radiation causes rapid local changes in the imaging layer thereby causing the material to be ejected from the layer. Ablation imaging is distinguishable from other material transfer techniques in that some sort of chemical change (eg bond breaking) rather than a completely physical change (eg melting, evaporation, sublimation) causes an almost complete transfer of the image dye rather than a partial transfer. The transmission Dmin density value serves as a measure of the completeness of image dye removal by the laser.

U.S. Pat. No. 5,468,591 relates to a direct image recording film which has a barrier layer between the support and the image recording layer to prevent downward migration of dyes during the ablation process. The barrier layer itself is partially or completely ablated during imaging, resulting unacceptably low Dmin values. A typical barrier layer disclosed includes an infrared (IR)-absorbing dye and a binder copolymer of 80:20 wt % poly (methyl cyanoacrylate-coethyl cyanoacrylate). However, there is a problem with the above prior art barrier layer in that it is applied by coating from organic solvents such as acetonitrile or acetone. The use organic solvents in production coating is undesirable because of fire and health risks. Also the solvent evaporating from the coating must be captured during manufacturing to prevent pollution, which is an expensive process. A solution to this problem is disclosed in U.S. Pat. No. 5,712,079 which describes the preparation of a barrier layer using an aqueous latex dispersion of a polycyanoacrylate polymer. However this requires that on preparation of the polymer, the polymer solution is deliberately diluted to 20% solids with ethyl acetate and methanol to enable the preparation of the latex loaded dispersions. This extra volatile organic solvent then needs to be removed by evaporation which means an extra step is required.

U.S. Pat. No. 6,068,967 describes the use of polymers containing di-carboxylic acid groups incorporated as preformed metal salts in the preparation of solid particle dispersions of filter dyes where they confer small particle size and improved wash out for silver halide photographic material.

U.S. Pat. No. 5,657,931 describes dispersants to provide stable solid particle dispersions. The polymer surfactants described are based on alkylene oxide groups and are not entirely suitable for the dual purpose role fulfilled by the polymers used in the present invention.

Problem to be Solved by the Invention

For environmental reasons it is desirable to reduce further the use of volatile organic solvents and the present invention provides a solution to this problem by the provision of a method for the production recording elements using aqueous solid particle dispersions.

SUMMARY OF THE INVENTION

According to the present invention there is provided an aqueous solid particle dispersion suitable for application to a substrate to form a coating said dispersion comprising: a polymer, an infrared-absorbing material and a surfactant to stabilize the dispersion and wherein the polymer is a copolymer of (i) a monomer that will confer thermally degradability and (ii) a monomer that will confer water dispersibility.

ADVANTAGEOUS EFFECT OF THE INVENTION

The aqueous dispersions have the advantages of simplicity of preparation being made by an essentially one pot method and their reduced amounts of volatile organic components.

BRIEF DESCRIPTION OF THE DRAWINGS

FIG. 1 shows the results of the evaluation of coatings for use in laser thermal imaging.

DETAILED DESCRIPTION OF THE INVENTION

The term thermally degradable applied to a polymer in the present specification means that the polymer will be thermally degraded under the action of a laser used in laser thermal imaging.

Infrared absorbing materials are sometimes referred to as infrared-absorbing dyes (abbreviated to i.r. dyes) in the laser thermal imaging art.

The term polymer includes copolymer unless the context requires otherwise.

The aqueous dispersions of the present invention preferably contain less than 5%, more preferably less than 2%, and most preferably are substantially free of organic solvents.

Typical amounts of polymer maybe from 1% to 15% (e.g., 1–12%), preferably from 1% to 7% (e.g., 1–5%) based on the combined weight of water and polymer, and the ratio of dye to polymer by weight is conveniently in the range from 0.02 to 1 to 0.75 to 1, preferably from 0.05 to 0.5 to 1.

As referred to above the polymer is a copolymer of (i) a monomer that will confer thermally degradability and (ii) a monomer that will confer water dispersibility.

Examples of (i) are cyanoacrylates such as substituted or unsubstituted alkyl cyanoacrylates, for example methoxyethyl cyanoacrylate(MECA) and examples of (ii) are monomers containing one or more hydrophilic groups such as carboxylic acid groups, for example methacrylic acid (E).

Suitable molar ratios of monomer (i) to monomer (ii) are from 1:1 to 12:1, preferably from 2:1 to 6:1.

Conveniently the size of the particles in the dispersion is in the range 10 to 50 nm and typically preferably 15 to 50 nm, more preferably 20 to 45 nm and most preferably from 30 to 40 nm in diameter as measured by cryo TEM.

Suitable surfactants to stabilize the dispersions include those having an HLB (hydrophilic/lipophilic balance) of at least 8.

Examples are compounds containing blocks of hydrophilic and hydrophobic units such as block copolymers containing blocks of ethylene oxide and blocks of propylene oxide.

Surfactants of this type are available commercially from BASF under the trade mark Pluronic.

In addition it is preferred that the dispersion further includes a dispersing agent capable of forming a salt or salt-like complex with the carboxylic acid groups in the copolymer. Suitable dispersing agents are inorganic and or organic bases. Suitable organic bases include amines particularly trialkyl amines such as triethylamine which may typically be present in a concentration of 0.5 to 2.5% by weight of the combined weight of water and dispersing agent.

Desirably the organic base is a liquid at room temperature i.e 15° C.

The aqueous solid particle dispersions may be prepared by milling, conveniently in a ball mill, the polymer and infrared-absorbing material in the presence of water together with a surfactant to stabilize the dispersion.

According to another aspect of the present invention there is provided a donor element for use in laser thermal imaging said donor element having a layer comprising:

an infrared-absorbing material, an image dye and a polymer matrix comprising a thermally degradable polymer and a non-thermally degradable polymer.

Preferably the non degradable polymer and infrared absorbing material will be selected so that there is a physical interaction such as hydrogen bonding or an interaction between hydrophobic groups (sometimes referred to as adventitious hydrophic interaction) between them to improve retention of the infrared-absorbing material in the donor element.

Preferably the degradable and non-degradable polymers are copolymers both of which contain a monomer which is the same for example methacrylic acid as a monomer.

A preferred degradable polymer is a copolymer of methoxyethyl cyanoacrylate and methacrylic acid preferably in molar proportions of from 1:1 to 12:1. and a preferred the non degradable polymer is a copolymer of methyl methacrylate and methacrylic acid preferably in molar proportions of from 1:1 to 15:1.

The invention provides a method for the preparation of a donor element as hereinbefore defined which method comprises forming an aqueous solid particle dispersion containing the components of the layer and applying the dispersion to a substrate to form a layer thereon.

A preferred embodiment of the method comprises the following steps:

(a) dispersing the infrared-absorbing material and the non-degradable polymer in the absence of the degradable polymer to form dispersion (A).

(b) dispersing the image dyes and degradable polymer to form dispersion (B) and (c) blending dispersions (A) and (B).

Steps (a) and (b) may be performed in any order.

The preparation of milled dispersions is described in the following Examples.

EXAMPLES

Aqueous mixes of dye and polymer (2.9% polymer) were made up in jars so that a ratio of dye to polymer of 0.15:1 was achieved. Also included in the mixes were the various addenda (including surfactants such as Pluronic F108, and/ or the oligomeric acrylamides S1 and S2 defined hereinafter) followed by the zirconia grinding beads (1 mm diameter). In some instances the aqueous mix was made up using the same contents and ratios as the latex loaded dispersions, including triethylamine but without the highly volatile solvents. The jars were then rolled for 5 days on a Multifix Roller Mill, the grinding beads were filtered off and the filtrate was analysed.

The dispersions incorporating PCyA flocculated but the best of these was with D2 dye; however, it did not coat successfully. In those dispersions containing MECA/E (4.1:1) and MECA/E (10.7:1), the presence of triethylamine, at concentrations of less than 1.5%, was extremely beneficial for particle size and stability. The dispersions which were made with triethylamine had such fine particle sizes that they could not be seen using a conventional microscope at maximum magnification. S1 and S2 were good replacements for Pluronic F108 in these dispersions; even where triethylamine was not used, they showed much less flocculation. However, in the absence of triethylamine (or triethanolamine) the dispersions were unstable although the dispersions with S1 and S2 surfactants took longer to settle out than those of Pluronic F108.

Triethylamine has a smell but this is much diminished after milling.

The details of the components used to make up the dispersions and the properties of the resulting dispersions are summarized in Tables A and B, shown hereafter.

Solid Particle Dispersions for ACLT Media

The preparation of solid particle dispersions by ball milling was investigated as a means of providing an aqueous coatable barrier layer. This consisted of IR dye D1 (or D2) as the main material for milling and copolymers of methoxyethylcyanoacrylate with methacrylic acid (MECA/E), some triethylamine (equimolar with the methacrylic acid) and a small amount of Pluronic F108 surfactant. The dispersions made with these polymers had very small particle sizes and could not be seen with an optical microscope at maximum magnification. However, the fact that this dispersion method worked well with the IR dyes D1 and D2 did not necessarily imply that it would work with any of the imaging dyes under investigation in this programme; with the Thin Donor formulation, three dyes are involved. In the following Examples several different dyes were milled together.

A variety of formulations with dyes and polymers at different concentrations were made using the general method for making the solid particle dispersions shown hereinafter, all based on the Thin Donor dye set which comprised
the IR dye D2 as well as the image dyes D5 and D4 (although, in a few instances, D1 was used instead of D2). The outcome was surprisingly good. Some dispersions had well dispersed particles with very little clumping. The results are recorded in Table C, shown hereafter.

However, the particles in these dispersions were not as small as those observed for the dispersions obtained with IR dye D1 on its own with MECA/E (4.1:1).

The thermally degradable polymer (a) selected was one the cyanoacrylate/methacrylic acid copolymers which had been successfully developed and used in LDRT, viz poly (methoxyethyl cyanoacrylate-co-methacrylic acid) (4.1:1). Its structure is shown below.

The use of cyanoacrylate/methacrylic acid copolymers in thermal imaging media has been described in U.S. Pat. No. 5,712,079.

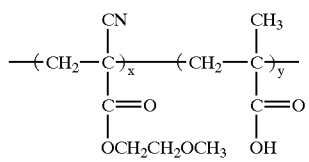

x = 4.1, y = 1.0

Poly(methoxyethyl cyanoacrylate-co-methacrylic acid) (4.1:1)

Poly(methyl methacrylate-co-methacrylic acid) (various monomer ratios, 3:1,10:1) was selected as the structurally compatible, non-degradable partner (b) in the donor polymer matrix. Its structure is represented below.

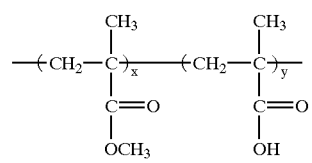

x = 3.0, 10.0; y = 1.0

Poly(methyl methacrylate-co-methacrylic acid)

Polymers were prepared by conventional free radical solution polymerisation, scaled up to ca 200 g. Molecular weight and compositional data were obtained by SEC and nmr respectively.

The polymers have the following general formula:

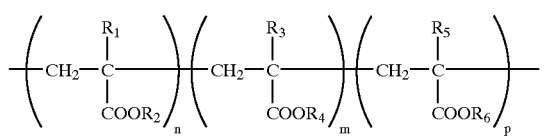

Where n, m and p are the same or different.

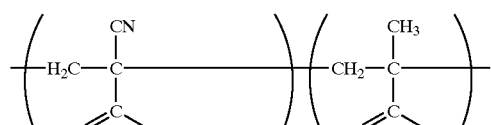

MECA/E
(4.1:1)

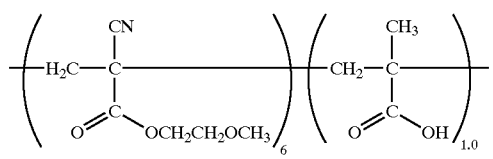

MECA/E
(6:1)

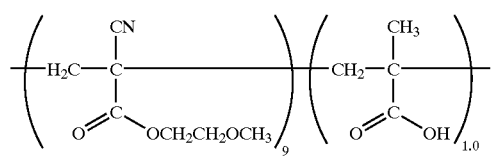

MECA/E
(9:1)

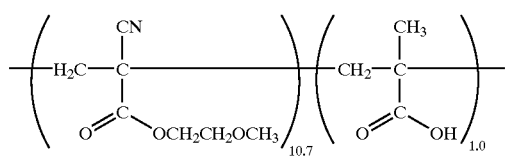

MECA/E
(10.7:1)

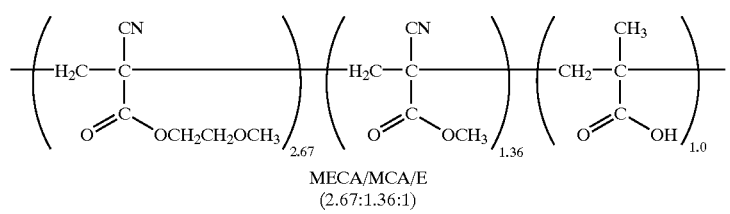

MECA/MCA/E
(2.67:1.36:1)

-continued
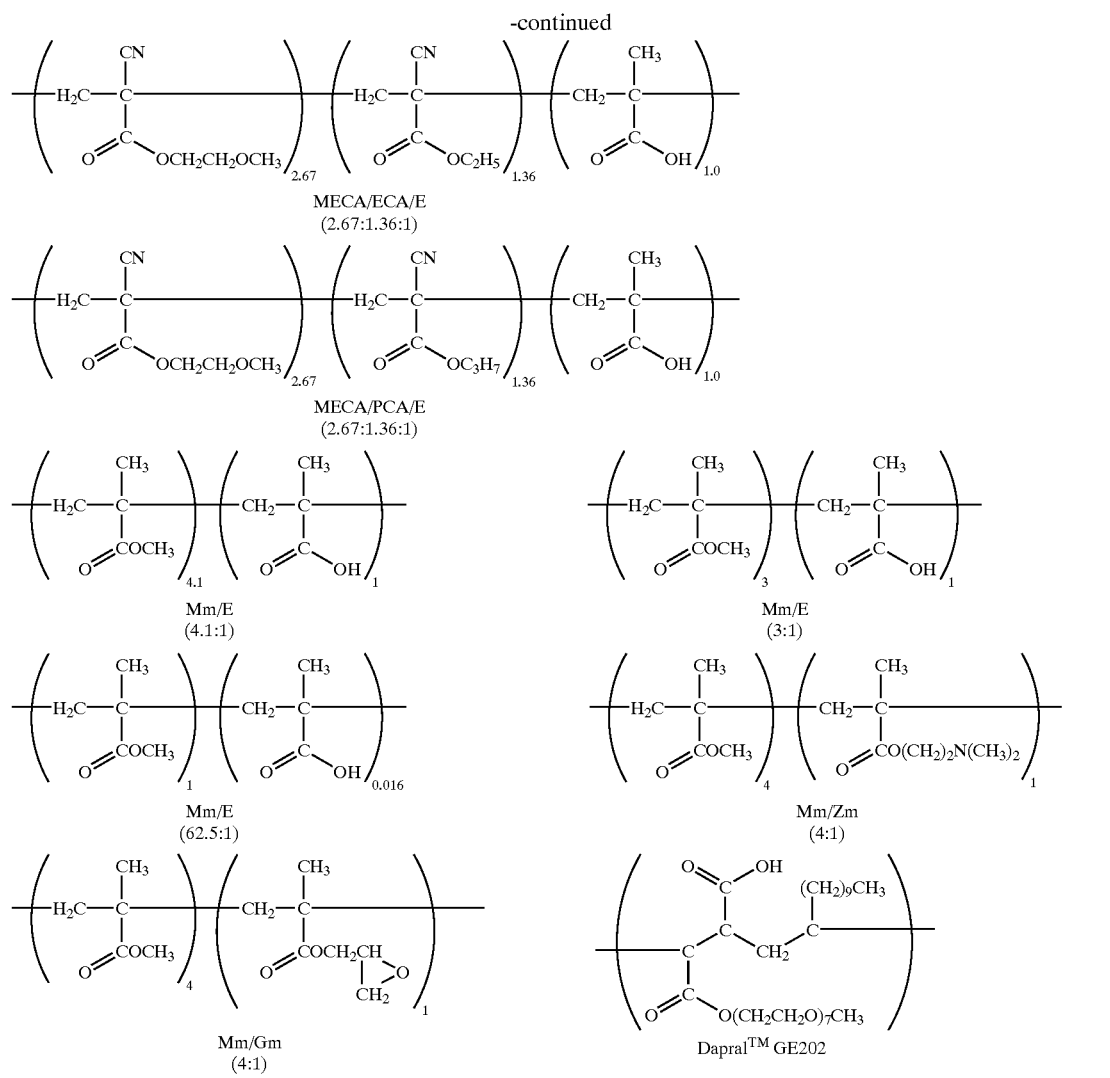
Comparative polymers
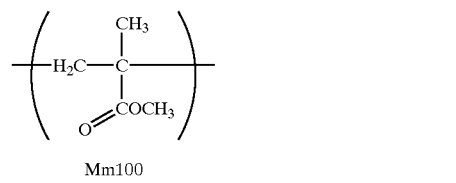
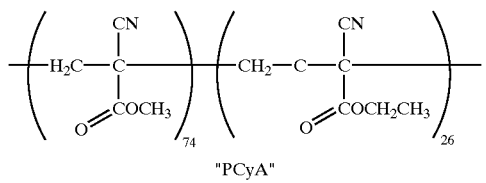
Structures of Dyes Used:
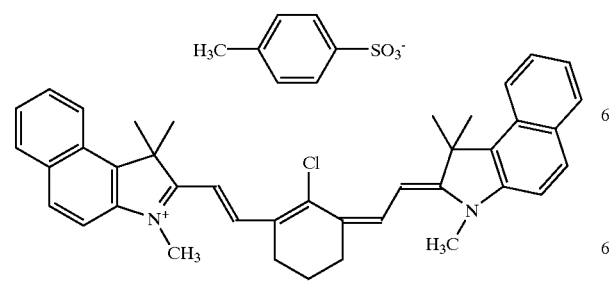
-continued
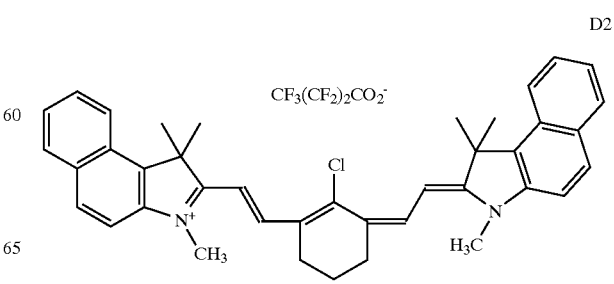

-continued

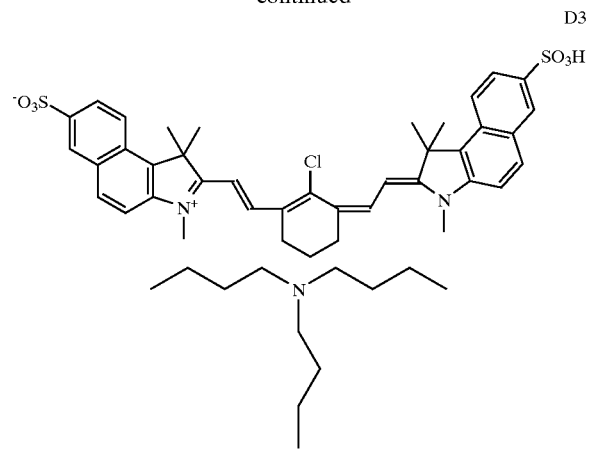

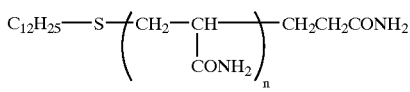

Surfactants Used in the Invention:

Synperonic PE™/F68 and Pluronic™ F108 are block copolymers of propylene oxide and ethylene oxide manufactured by BASF.

S1 and S2 are oligomeric acrylamides of the following general structure:

$$C_{12}H_{25}-S-(CH_2-CH(CONH_2))_n-CH_2CH_2CONH_2$$

n=20 in S1,
n=12 in S2

Any nonionic surfactant of HLB (hydrophilic/lipophilic balance) above 8 could be used in this invention. Anionic surfactants could also be used in this invention.

Solid Particle Dispersions: Examples

General Solid Particle Dispersion Preparation Method

For each dispersion batch, the dispersion components were weighed into a brown glass jar with water and then zirconia grinding beads (1 mm diameter), were added. The glass jar was well sealed and placed on the Multifix roller mill to be "rolled" for 7 days. When this had been done, the zirconia beads were filtered off (through a fine-mesh sieve) and a sample of the dispersion was inspected under the microscope at ×1250 magnification using an oil immersion objective, or dried down and examined at ×500 magnification.

The results are shown in Table A, B, C, D and E. The mean particle sizes shown in Table C were measured by photon correlation spectroscopy using a Malvern Autosizer.

Data Tables for Solid Particle Dispersions

TABLE A. First Ball-milled dispersions (LDRT).

TABLE B. Ball-milled dispersions for coating (LDRT).

TABLE C. Ball-milled dispersions of different polymers with a blend of 3 dyes. (ACLT).

TABLE D. Solid particle dispersions of IR dye D2 with poly(methyl methacrylate-co-methacrylic acid) at different ratios.

TABLE E. Ball milled dispersions of IR dye D3 with different polymers, bases and surfactants.

TABLE A

Ball-milled dispersions of methacrylic acid copolymers

| Dispn. Batch No. | Dispn. method | IR dye KAN | Polymer | % dye | % polymer | Surfactant (%) | Additional surfactant (%) | Other addenda (%) | Comment |
|---|---|---|---|---|---|---|---|---|---|
| 3662 | Ball mill | D1 | MECA/E (4.1:1) | 0.44 | 2.9 | Pluronic F108 (0.08) | — | PVP, 40k (0.19) | flocs |
| 3663 | Ball mill | D1 | MECA/E (4.1:1) | 0.44 | 2.9 | Pluronic F108 (0.08) | PEGCME, Mn 600 (0.23) | — | flocs |
| 3664 | Ball mill | D1 | MECA/E (4.1:1) | 0.44 | 2.9 | Pluronic F108 (0.08) | PEGCME, Mn 250 (0.23) | — | flocs |
| 3665 | Ball mill | D1 | MECA/E (4.1:1) | 0.44 | 2.9 | Pluronic F108 (0.08) | — | — | flocs |
| 3666 | Ball mill | D1 | MECA/E (4.1:1) | 0.44 | 2.9 | Pluronic F108 (0.15) | — | — | flocs |
| 3667 | Ball mill | D1 | MECA/E (4.1:1) | 0.44 | 2.9 | Pluronic F108 (0.08) | — | NEt3 (1.19) | too small to see under microscope |

TABLE A-continued

Ball-milled dispersions of methacrylic acid copolymers

| Dispn. Batch No. | Dispn. method | IR dye KAN | Polymer | % dye | % polymer | Surfactant (%) | Additional surfactant (%) | Other addenda (%) | Comment |
|---|---|---|---|---|---|---|---|---|---|
| 3668 | Ball mill | D1 | MECA/E (4.1:1) | 0.44 | 2.9 | Pluronic F108 (0.08) | S1 (0.19) | — | fine particles-dispersion unstable |
| 3669 | Ball mill | D1 | MECA/E (4.1:1) | 0.44 | 2.9 | Pluronic F108 (0.08) | S2 (0.19) | — | v.v.fine particles-dispersion unstable |

Ba 3667 was the best of these.

The best dispersion shown in Table A was obtained where triethylamine had been incorporated with the methacrylic acid copolymer—without triethylamine, the dispersions eventually flocculated. Although the use of the oligomeric acrylamides as additional surfactants also provided good dispersions initially, these were not stable and eventually flocculated. Even at this low concentration of dye, neither polyvinyl pyrrolidone (PVP), nor poly(ethyleneglycol carboxymethyl ether) (PEGCME) polymers provided stable dispersions.

the milling procedure, but even these dispersions showed some flocculation unless triethylamine or triethanolamine were also present. The table also shows that good dispersions can also be made with a lower level of triethylamine, this is desirable because triethylamine is rather smelly. It was also noted after milling, that the material was not as pungent as it had been when milling commenced.

Although it was possible to produce good dispersions with the oligomeric surfactants (and no triethylamine), these

TABLE B

Ball-milled dispersions for coating

| Dispn. Batch No. | IR dye | Polymer type | % dye | % polymer | Surfactant (%) | Addenda (%) | Comment | Tested |
|---|---|---|---|---|---|---|---|---|
| 3698 | D1 | MECA/E (4.1:1) | 0.44 | 2.9 | Pluronic F108 (0.08) | | Some flocculation. | Yes |
| 3699 | D1 | MECA/E (4.1:1) | 0.44 | 2.9 | S1 (0.19) | | fine particles | No |
| 3700 | D1 | MECA/E (4.1:1) | 0.44 | 2.9 | S2 (0.19) | | fine particles | No |
| 3701 | D1 | MECA/E (4.1:1) | 0.44 | 2.9 | S1 (0.38) | | fine particles | No |
| 3702 | D1 | MECA/E (4.1:1) | 0.44 | 2.9 | S1 (0.56) | | fine particles | No |
| 3703 | D1 | MECA/E (4.1:1) | 0.44 | 2.9 | S2 (0.38) | | fine particles | No |
| 3704 | D1 | MECA/E (4.1:1) | 0.44 | 2.9 | S2 (0.56) | | fine particles | No |
| 3705 | D1 | MECA/E (4.1:1) | 0.44 | 2.9 | S1 (0.19) | NEt3 (1.43) | fine particles | Yes |
| 3706 | D1 | MECA/E (4.1:1) | 0.44 | 2.9 | S2 (0.19) | NEt3 (1.43) | fine particles | Yes |
| 3707 | D2 | MECA/E (4.1:1) | 0.46 | 2.9 | Pluronic F108 (0.08) | NEt3 (1.43) | Occasional floc | Yes |
| 3708 | D1 | PCyA* | 0.44 | 2.9 | Pluronic F108 (0.08) | NEt3 (1.43) | some floccculation | No |
| 3709 | D2 | PCyA* | 0.46 | 2.9 | Pluronic F108 (0.08) | NEt3 (1.43) | some flocculation | Yes |
| 3710 | D1 | MECA/E (10.7:1) | 0.44 | 2.9 | Pluronic F108 (0.08) | NEt3 (0.48) | fine particles | Yes |
| 3711 | D2 | MECA/E (10.7:1) | 0.46 | 2.9 | Pluronic F108 (0.08) | NEt3 (0.48) | fine particles | Yes |
| 3712 | D1 | MECA/E (10.7:1) | 0.44 | 2.9 | Pluronic F108 (0.08) | N(EtOH)3 (0.71) | fine particles | Yes |

Notes Relating to Table B

PCyA is the polymer used in Volcano product (containing no methacrylic acid units); this was very difficult to break down and the resulting "dispersion" was strongly flocculated. The other polymers ground down more readily during dispersions were not stable—over a period of time they had flocculated, which is why they were not tested. The results with the oligomeric surfactants shows that a wide range of nonionic surfactants can be used to aid milling of the dye with polymer.

TABLE C

Ball-milled dispersions of different polymers with a blend of 3 dyes.

| Batch No | Polymer type | % Polymer | IR dye | % IR dye | % D4 | % D5 | % Triethylamine | % Pluronic F108 | Mean Particle size (microns) |
|---|---|---|---|---|---|---|---|---|---|
| 3861 | MECA/E (4.1:1) | 5.32 | D1 | 0.537 | 1.67 | 0.476 | 2.6 | 0.07 | 0.233 |
| 3862 | MECA/E (4.1:1) | 5.2 | D2 | 1.05 | 3.28 | 0.934 | 2.6 | 0.07 | 0.198 |
| 3864 | Mm/E (4.1:1) | 2.71 | D1 | 1.09 | 3.41 | 0.973 | 1.4 | 0.07 | 0.181 |
| 3871 | Mm/E (4.1:1) | 4.95 | D2 | 1.996 | 6.23 | 1.78 | 2.5 | 0.07 | 0.168 |

D4 and D5 are image dyes.

All the dispersions shown in Table C were well dispersed and coated well. This shows that it is possible to make good solid particle dispersions of a blend of dyes and at a fairly broad range of concentrations.

Dispersions of the IR dye with methyl methacrylate homopolymer gave dispersions with larger particle sizes than those of the copolymers. In addition to this, at higher ratios of polymer, the dispersions of homopolymer were also strongly flocculated. The dispersions of the ethyl trimethyl

TABLE D

Solid particle dispersions of IR DYE D2 with poly(methyl methacrylate-co-methacrylic acid) at different ratios.

| Dispersion Batch Number | Polymer used | Polymer/dye ratio | Triethylamine (g) | Comments |
|---|---|---|---|---|
| 3979 | Mm/E (6.3:1) | 5:1 | 0.02 | Good yield. Very fine particles loosely flocculated. |
| 3980 | Mm | 5:1 | — | Good yield. Larger particles than Ba. 3979, strongly flocculated |
| 3981 | Mm/E (6.3:1) | 4:1 | 0.02 | Good yield. Particles too small to be seen under optical microscope. |
| 3982 | Mm | 4:1 | — | Good yield. Particles smaller than Ba.3980, still strongly flocculated. |
| 3983 | Mm/E (6.3:1) | 3:1 | 0.02 | Good yield. Particles too small to be seen under optical microscope. |
| 3984 | Mm | 3:1 | — | Good yield. Very fine particles loosely flocculated. |
| 3985 | Mm/E (6.3:1) | 2:1 | 0.02 | Good yield. Particles too small to be seen under optical microscope. |
| 3986 | Mm | 2:1 | — | Good yield. Particles too small to be seen under optical microscope. |
| 3987 | Mm/Zm80 | 5:1 | — | Good yield. Particles too small to be seen under optical microscope. |
| 3988 | MmGm | 5:1 | — | Lots of bits of dye (+ polymer?) were filtered out, yield was low, but remaining particles in dispersion too small to be seen under optical microscope. |
| 3989 | Mm/Zm80 | 3:1 | — | Good yield. Particles too small to be seen under optical microscope. |
| 3990 | Mm/Gm | 3:1 | — | Lots of bits of dye (+ polymer?) were filtered out, yield was lower than Ba. 3988, but remaining particles in dispersion too small to be seen under optical micrsocope. |

Notes Relating to Table D

In each dispersion the IR dye D2 (0.8 g) was placed in a brown glass jar together with polymer, surfactant Pluronic F108 (0.05 g), water (25 g) and zirconia grinding beads (1 mm diameter). When a polymer with methacrylic acid groups was used, then a small amount of triethylamine was also added—in some cases, notably when Mm or MmZm or MmGm were used, triethylamine served no purpose, so it was not used. The glass jar was well sealed and placed on a Multifix roller mill to be "rolled" for 7 days. When this had been done, the zirconia beads were filtered off (through a small sieve) and a sample of the dispersion was inspected under an optical microscope.

amino ester of methacrylic acid (MmZm) also provided stable dispersions without the need for triethylamine because this copolymer effectively had the amine "built-in". The yield from the dispersion made with MmGm was low largely because a significant amount of polymer had not been ground down sufficiently and this was still in large lumps which was effectively filtered out; however, the some of the polymer had been milled successfully enough to adsorb on the surface of the dye forming very small particles—however the ratio of polymer to dye in these dispersions would not be at the level applied at the start of the milling procedure.

TABLE E

Ball milled dispersions of IR dye D3 with different polymers, bases and surfactants.

| Batch Nos | % Dye | Polymer | % Polymer | Surfactant (%) | Base (%) | Comment |
|---|---|---|---|---|---|---|
| 4056 | 0.44 | MECA/E (4.1:1) | 2.88 | Pluronic F108 (0.08) | NEt$_3$ (0.48) | v. fine dispersion. Too small to be seen under optical microscope. |
| 4060 | 0.44 | MmE (3:1) | 2.88 | Pluronic F108 (0.08) | NEt$_3$ (0.48) | v. fine dispersion. Too small to be seen under optical microscope. |

TABLE E-continued

Ball milled dispersions of IR dye D3 with different polymers, bases and surfactants.

| Batch Nos | % Dye | Polymer | % Polymer | Surfactant (%) | Base (%) | Comment |
|---|---|---|---|---|---|---|
| 4079 | 0.44 | MECA/MCA/E (2.67:1.36:1) | 2.89 | Pluronic F108 (0.08) | $NEt_3$ (0.48) | v. fine dispersion. Too small to be seen under optical microscope. |
| 4080 | 0.44 | MECA/E (4.1:1) | 2.88 | Pluronic F108 (0.08) | $NEt_3$ (0.048) | Small well-dispersed particles. |
| 4082 | 0.44 | MECA/E (4.1:1) | 2.88 | Pluronic F108 (0.08) | NaOH (0.02) | Small well-dispersed particles. |
| 4083 | 0.44 | MECA/E (4.1:1) | 2.88 | Pluronic F108 (0.08) | $Na_2CO_3$ (0.03) | Small well-dispersed particles. |
| 4084 | 0.44 | MECA/E (4.1:1) | 2.88 | Pluronic F108 (0.08) | $NaHCO_3$ (0.05) | Small well-dispersed particles. |
| 4087 | 0.86 | MECA/E (4.1:1) | 5.58 | Pluronic F108 (0.15) | $NEt_3$ (0.47) | v. small, well dispersed particles. |
| 4089 | 0.44 | MECA/ECA/E (2.67:1.36:1) | 2.89 | Pluronic F108 (0.08) | $NEt_3$ (0.48) | Small, well-dispersed particles. |
| 4091 | 0.44 | MECA/PCA/E (2.67:1.36:1) | 2.89 | Pluronic F108 (0.08) | $NEt_3$ (0.48) | Small, well-dispersed particles. |
| 4092 | 0.44 | MECA/E (10.7:1) | 2.88 | Pluronic F108 (0.08) | $NEt_3$ (0.48) | Small, well-dispersed particles. |
| 4093 | 0.44 | MECA/E (6:1) | 2.88 | Pluronic F108 (0.08) | $NEt_3$ (0.48) | Small, well-dispersed particles. |
| 4094 | 0.44 | MECA/E (9:1) | 2.88 | Pluronic F108 (0.08) | $NEt_3$ (0.48) | Small, well-dispersed particles. |
| 4100 | 0.44 | MECA/E (4.1:1) | 2.88 | Synperonic PE/F68 (0.08) | $NEt_3$ (0.48) | Small, well-dispersed particles. |

Notes Relating to Table E

The data show that good dispersions can be made with bases other than triethylamine. A wide variety of methacrylic acid copolymers have been used successfully to make solid particle dispersions of a zwitterionic IR dye.

Example of Polymer Synthesis: MECA/E (4.1:1)

Recipe

| | |
|---|---|
| Methoxyethyl 2-cyanoacrylate (MECA) (Henkel Sicomet$^R$ 9000) | 11.06 g (7.14 × 10$^{-2}$ moles) |
| Methacrylic acid (E) | 1.51 g (1.76 × 10$^{-2}$ moles) |
| Azo-bis-isobutyronitrile (AIBN) | 0.18 g |
| Dioxan | 180 ml (150 ml + 30 ml) |

Procedure

The above were placed in a 3-neck 500 ml round-bottomed flask equipped with stirrer flea, nitrogen blanket and condenser. The monomer solution was purged with nitrogen before use, and the AIBN was washed into the flask with the second (30 ml) portion of dioxan.

The reaction was maintained at 60° C. in an oil bath, and continuous stirring and a nitrogen blanket were maintained throughout its 21 hour duration.

At the end of the reaction period, the polymer was precipitated by addition of the flask contents to diethyl ether (1000 ml) with stirring. The polymer was filtered off and dried in a vacuum oven at room temperature overnight. Molecular weight and compositional data were obtained by SEC and nmr, respectively.

Yield=8.46 g(67.30%)

Example of Melting and Hand Coating for Aqueous Coatable Laser Thermal (ACLT) Experimental Media The quickest method of screening the best dispersions was by hand coating using a hand coating machine.

Base Used and Gel Pad Experiments

As the dispersion melts used for this work contained a high proportion of water it was found necessary to coat the Estar base with a gel pad layer first.

The first gel pad experiment coated had a gel laydown of 6 g/m$^2$ and a hardener level of 0.5%, and was coated on a coating machine. The resulting coating had a high measured swell of 27 microns. However, the gel pad was found to be too soft, and when overcoated with the dispersion melt it swelled rapidly and was scored by the wire on the coating bar. This caused the final coating to be uneven and the line defects were found to transfer to the intermediate receiver when the donor coatings were exposed.

Because of this a larger gel pad experiment was designed for coating on a coating machine which covered a range of gel laydowns and hardener %, a summary of which is shown below in Table F.

TABLE F

| Coating Number | Gel pad Laydown (g/m$^2$) | Hardener Level % |
|---|---|---|
| S102141 | 6.0 | 0.5 |
| S102142 | 5.0 | 0.5 |
| S102143 | 4.0 | 0.5 |
| S102144 | 6.0 | 0.75 |
| S102145 | 5.0 | 0.75 |
| S102146 | 4.0 | 0.75 |
| S102147 | 6.0 | 1.0 |
| S102148 | 5.0 | 1.0 |
| S102149 | 4.0 | 1.0 |

The resulting coatings were evaluated on the research swell meter to determine the impact of hardener and gel laydown on the water take-up. The results are shown in Table G.

TABLE G

| Coating Number | Final Mean Swell (microns) | Solution Temp (C.) |
|---|---|---|
| S102141 | 19.9 | 22.1 |
| S102142 | 16.3 | 22.0 |
| S102143 | 13.9 | 21.9 |

TABLE G-continued

| Coating Number | Final Mean Swell (microns) | Solution Temp (C.) |
|---|---|---|
| S102144 | 11.1 | 21.3 |
| S102145 | 12.9 | 21.4 |
| S102146 | 11.0 | 21.1 |
| S102147 | 14.5 | 20.9 |
| S102148 | 12.4 | 21.3 |
| S102149 | 7.9 | 21.0 |

When these gel pads were subsequently overcoated with a dispersion test melt it was found that the score lines were virtually eliminated by using a hardener level of 0.75%. At the higher 1.0% hardener level the lines had completely disappeared. As there was some deterioration in the coating quality as the hardener level was increased it was found better to keep the gel laydowns as high as possible to maximise the swell. Because of this coating S 102147 was selected as the best of these gel pads.

Melt Formulations

When coating the ball-milled polymer dispersions, no gelatine was added to the melts, but a small amount of FAC-0555 (a fluorosurfactant) was added. Four different copolymer dispersions were chosen for this experiment and were either used singly in the melt or in combination. The copolymers used in the dispersions were either MECA/E (4.1:1) or (Mm/E) (4.1:1). Two different IR dyes D1 and D2 were used with these copolymers.

Example of Evaluation of Media

This section describes the evaluation of media comprising coatings obtained from melts prepared from Solid Particle Dispersions described above, which in turn incorporated polymers whose synthesis by free radical addition polymerisation is exemplified above.

The coatings included an image dye.

Table H shows the results achieved. The exposure value and La*b* data are all given for a transferred cyan density of 1.3.

TABLE H

| Polymer 1 | IR Dye | Polymer 2 | IR Dye | Blend ratio | Exp mJ/cm$^2$ | L | a* | b* |
|---|---|---|---|---|---|---|---|---|
| MECA/E | D1 | | | | 211.9 | 53.9 | −30.1 | −34.6 |
| MECA/E | D2 | | | | 211.6 | 55.6 | −30.8 | −34.2 |
| Mm/E | D1 | | | | 282.1 | 52.1 | −22.3 | −34.0 |
| Mm/E | D2 | | | | 354.9 | 50.0 | −20.4 | −34.7 |
| MECA/E | D2 | Mm/E | D1 | 1:2 | 241.2 | 53.6 | −24.7 | −34.1 |
| MECA/E | D2 | Mm/E | D2 | 1:2 | 252.5 | 53.1 | −24.4 | −33.3 |
| MECA/E | D2 | Mm/E | D1 | 2:1 | 218.4 | 54.6 | −28.6 | −34.1 |
| MECA/E | D2 | Mm/E | D2 | 2:1 | 352.6 | 54.6 | −27.4 | −33.9 |
| Current Cyan Donor | | | | | 239 | 55.6 | −30.6 | −36.7 |
| HED* Cyan | | | | | 164 | 58.2 | −35.0 | −40.5 |

*HED is high energy donor.

From the exposure values it can be seen that the ablatable polymer gives the best result allowing good transfer of the cyan dyes but with a significant difference to the a* and b* values. The non-ablatable polymer results in a slow response with poor colorimetry. Coated blends of these two polymer types allow a variation in response proportional to the ratio of the ablatable polymer. This effect is demonstrated in FIG. 1.

The invention has been described in detail with particular reference to certain preferred embodiments thereof, but it will be understood that variations and modifications can be effected within the spirit and scope of the invention.

What is claimed is:

1. A donor element for use in laser thermal imaging said donor element having a layer comprising:
   an infrared-absorbing material, an image dye and a polymer matrix comprising a thermally degradable polymer and a non thermally degradable polymer, wherein the thermally degradable polymer comprises a copolymer of a monomer that confers thermal degradability and a monomer that confers water dispersibility.

2. A donor element as claimed in claim 1 wherein there is a physical interaction between the infrared-absorbing material and the non degradable polymer to facilitate retention of the infrared-absorbing material in the donor element.

3. A donor element for use in laser thermal imaging said donor element having a layer comprising an infrared-absorbing material, an image dye and a polymer matrix comprising a thermally degradable polymer and a non thermally degradable polymer, wherein the thermally degradable polymer is a copolymer of a cyanoacrylate and methacrylic acid.

4. A donor element as claimed in claim 1 wherein the non thermally degradable polymer is a copolymer of methyl methacrylate and methacrylic acid.

5. A method for the preparation of a donor element having a layer comprising an infrared-absorbing material, an image dye and a polymer matrix comprising a thermally degradable polymer and a non thermally degradable polymer wherein the thermally degradable polymer comprises a copolymer of a monomer that confers thermally degradability and a monomer that confers water dispersibility, which method comprises forming an aqueous solid particle dispersion containing the components of the layer and applying the dispersion to a substrate to form a layer thereon.

6. A method as claimed in claim 5 which method comprises the following steps:
   (a) dispersing the infrared-absorbing material and the non degradable polymer in the absence of the degradable polymer to form dispersion (A)
   (b) dispersing the image dyes and degradable polymer to form dispersion (B) and
   (c) blending dispersions (A) and (B).

7. A method as claimed in claim 6, wherein the degradable polymer is a copolymer comprising a cyanoacrylate monomer and the non degradable polymer is a copolymer comprising a methacrylic acid monomer.

8. A donor element as claimed in claim 1, wherein both the thermally degradable polymer and the non thermally degradable polymer are copolymers that comprise methacrylic acid as a monomer.

9. A donor element as claimed in claim 1 wherein the thermally degradable polymer includes a copolymer comprising a cyanoacrylate monomer.

10. A donor element as claimed in claim 1 wherein the monomer that confers thermal degradability and the monomer that confers water dispersibility are present in the thermally degradable polymer in a ratio of from 1:1 to 12:1.

11. A donor element as claimed in claim 1 wherein the monomer that confers thermal degradability and the monomer that confers water dispersibility are present in the thermally degradable polymer in a ratio of from 2:1 to 6:1.

* * * * *